Oct. 24, 1933.　　　G. M. BARNES ET AL　　　1,931,522
ENDLESS TRACK FOR VEHICLES
Filed Nov. 26, 1930　　　2 Sheets-Sheet 1
Fig-1-
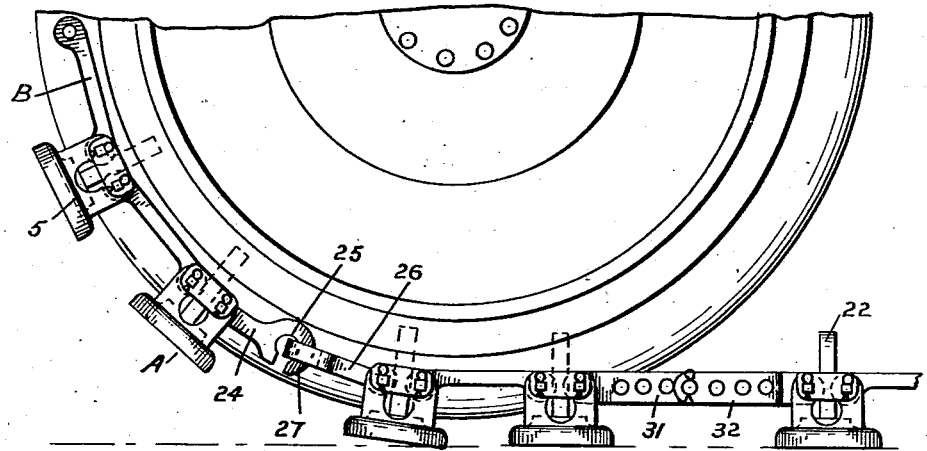
Fig-2-
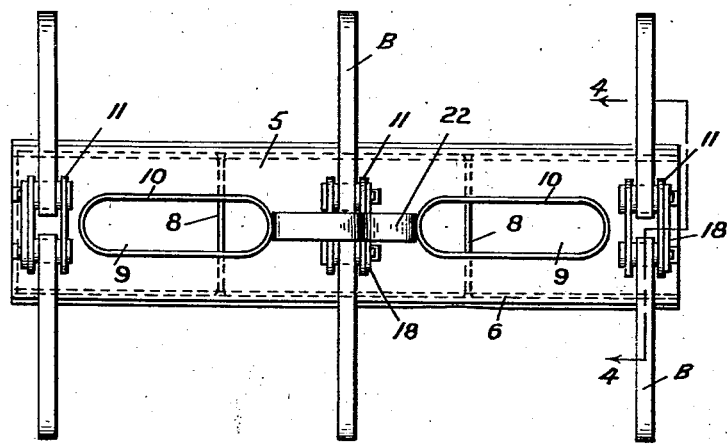
Fig-3-
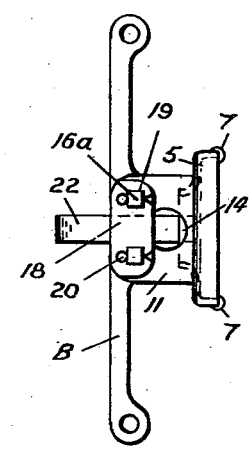
Fig-4-
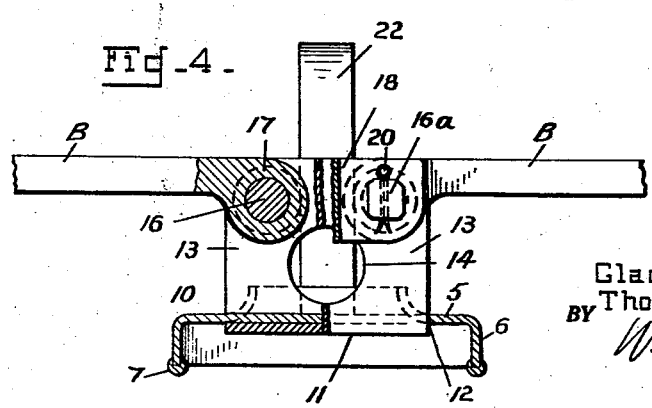
INVENTORS
Gladeon M. Barnes
Thomas H. Nixon
BY
W. N. Roach
ATTORNEY.

Oct. 24, 1933. G. M. BARNES ET AL 1,931,522
ENDLESS TRACK FOR VEHICLES
Filed Nov. 26, 1930 2 Sheets-Sheet 2
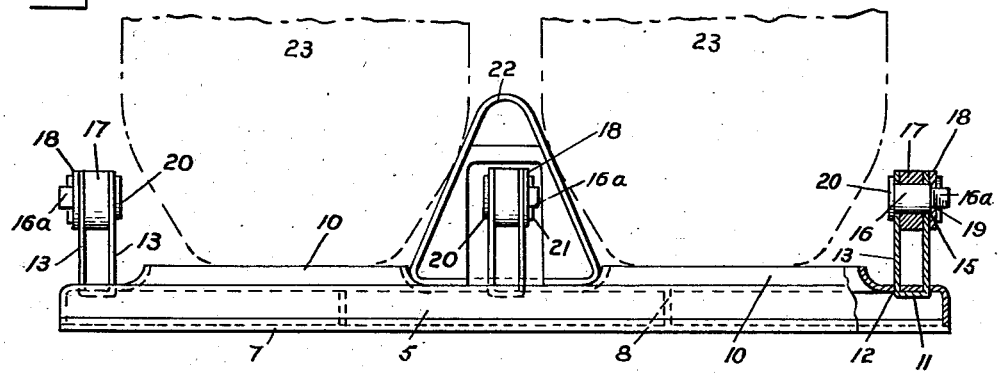
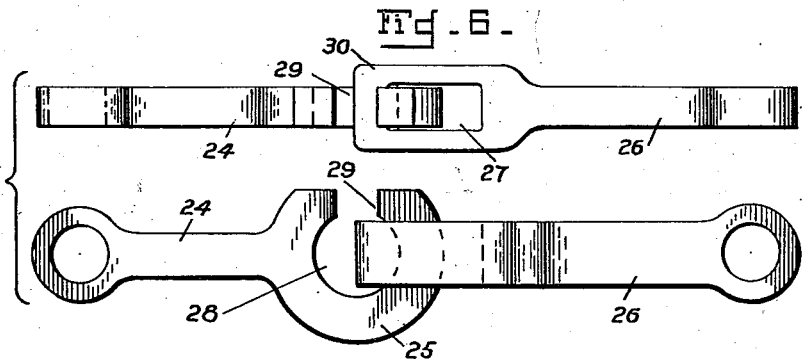
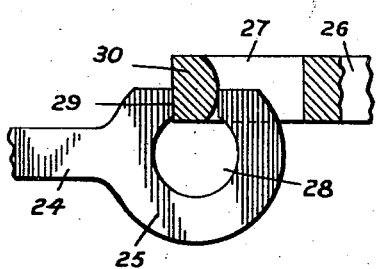
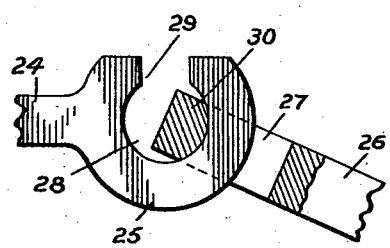
INVENTORS
Gladeon M. Barnes
BY Thomas H. Nixon
W. N. Roach
ATTORNEY Patented Oct. 24, 1933

1,931,522

UNITED STATES PATENT OFFICE 1,931,522

ENDLESS TRACK FOR VEHICLES

Gladeon M. Barnes, United States Army, Hastings, Mich., and Thomas Hay Nixon, United States Army, Gettysburg, Pa.

Application November 26, 1930
Serial No. 498,270

5 Claims. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an endless track for vehicles and is of the type particularly adapted for association with rubber tires in converting a wheeled vehicle into a track laying vehicle.

Since a track of this character forms part of the load of the vehicle when not in use it is especially important that it must be of minimum weight and maximum strength and must also be capable of being rapidly mounted and dismounted. With these requirements in view the track forming the subject of the present invention is characterized by a novel form of grouser or shoe arranged to provide traction with the tire as well as with the ground; by a link chain in which the shoes form alternate links; and by a coupling which is automatically held against disconnection when the track is in operation.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a portion of the track and vehicle;

Fig. 2 is an inside plan view of one section or unit of the track;

Fig. 3 is a view in end elevation of Fig. 2;

Fig. 4 is a sectional view on the line 4—4 of Fig. 2;

Fig. 5 is a view in front elevation of Fig. 2;

Figs. 6, 7 and 8 are enlarged detail views in side elevation of the coupling links.

Referring to the drawings by characters of reference:

The track comprises a series of grousers or shoes A connected in spaced relation by links B.

The shoes are all identical and each one is in the form of a channel plate having a flat oblong body 5 with perpendicular side walls 6 constituting transverse cleats on the outer or tread side of the shoe. The ground engaging edge of the side walls is enlarged, preferably by welding thereto a rounded bead member 7 which will increase the strength of the side walls and provide a renewable wearing surface when the track is operated on paved roads.

A plurality of webs 8 connect the side walls 6 and serve to stiffen them as well as to constitute longitudinal cleats to prevent side slipping. In a track adapted for twin wheels there are preferably four webs providing three substantially equal pockets.

The body 5 is provided with apertures 9, the number of apertures corresponding to the number of tires and each aperture extending transversely of the tread of the tire. The metal of the body that defines the aperture is pressed out to form a flange 10 on the inside of the shoe and when engaged by the resilient material of the tire will serve as a substitute for a gear drive, insuring the proper laying and picking up of the track without slippage of the wheels.

The apertures 9 each extend beyond one of the webs defining the central pocket on the outside tread of the shoe, thus providing two outlets which will effectively prevent mud from becoming caked in the pocket. The main portion of the aperture provides an outlet for the end pockets.

Referring to Fig. 5 each of the shoes carries three sets of ears 11, one being in the center and one at each end. Each set consists of a U-shaped member inserted through spaced apertures 12 in the body 5 and then welded in place. By thus inserting the member through the body any force tending to tip it will be transmitted to the body and not on the welded connection. Each side plate 13 of the U-shaped member is provided with a large aperture 14 to reduce weight and permit the clearing of mud and with a pair of spaced apertures 15—15. A pin 16 inserted through aligned apertures 15 serves to attach each link B to the shoe, the link having an eye 17 insertable between the side plates 13 and receiving the pin.

The two pins in each set of ears are held against turning by a plate 18 (Figs. 3 and 4) which is provided with square apertures 19 receiving the squared end 16a of the pin 16. This arrangement enables very thin metal to be employed for the side plates 13. The pin is formed with a head 20 and with a hole for receiving a cotter pin 21.

The central set of ears is disposed within a V-shaped guide 22 secured to the body 5 as by welding. The guide fits between the twin tires 23—23 and by engagement with the walls of the tires prevents the links B and the sets of ears 11 from rubbing against the tires.

In Figs. 6 to 8 there is shown a special link for forming the final hinge joint in coupling the ends of the chain. In order to avoid excessive slackness in the chain the final assembly must be made with little or no angularity between adjoining links. To this end one link section 24 is formed with a hook 25 and the other section 26 has an eye 27. The hook has a key-hole slot, the radius of the circular aperture 28 of the slot being substantially equal or slightly larger than the width of the non-circular entrance 29. The terminal portion 30 of the eye has a thickness that will just permit it to pass through the entrance 29 when the hook and eye sections are parallel in an end to end relationship. The inside of the terminal portion 30 is curved to conform to the curvature of the circular aperture 28. When the track is in operation centrifugal or gravity forces will create a slight angular relation between the sections and prevent withdrawal of the eye from the hook. If the sections should be in axial alignment as when the track is on a level surface, the lower flight of the track is normally under tension to position the parts as shown in Fig. 6. Even if such tension were not present and the parts could assume the initial assembly position as indicated in Fig. 7, the eye section would have to be elevated while remaining parallel to the hook section in order to permit separation. It would be practically impossible for such a movement to be reproduced accidentally as in passing over an obstruction.

The connection thus established is a very simple and effective one, and enables the chain to be rapidly coupled and uncoupled without the use of special tools.

Adjusting links 31 and 32 are provided for the purpose of taking up slack and they have a range of adjustment that will permit one complete shoe unit to be removed.

We claim:

1. A track for track-laying vehicles embodying articulated sections, each section comprising a transversely channeled shoe having a body whose side walls are marginally enlarged and form cleats on the outer tread, the body of the channeled shoe provided with apertures each defined marginally by a flange forming a cleat on the inside tread, webs extending across the channel to form pockets, the webs forming the center pocket bridging the apertures in the body, and links connecting adjacent shoes.

2. A track for track-laying vehicles embodying articulated sections, each section comprising a transversely channeled shoe having a body whose side walls are marginally enlarged and form cleats on the outer tread, the body of the channeled shoe provided with apertures, webs extending across the channel to form end and intermediate pockets, the webs forming the intermediate pocket bridging the apertures in the body, and links for connecting adjacent shoes.

3. A track for track-laying vehicles embodying articulated sections, each section comprising a plate formed with sets of spaced slots, a U-shaped member inserted through each set of slots and welded to the body and links attached to the U-shaped member.

4. A track for track-laying vehicles embodying articulated sections, each section comprising a shoe, sets of spaced plates secured to the shoe, each set of plates having a pair of aligned apertures, a link pin inserted through aligned apertures and having a non-circular portion, a locking plate having spaced non-circular apertures for receiving the corresponding portion of the link pins, and a link carried by each link pin.

5. A track for track laying vehicles embodying articulated sections, each section comprising a shoe, spaced link pins mounted in the shoe, a plate connecting the link pins and holding them against rotation and a link carried by each link pin.

GLADEON M. BARNES.
THOMAS HAY NIXON.